(12) United States Patent
Brossard et al.

(10) Patent No.: US 9,866,553 B2
(45) Date of Patent: Jan. 9, 2018

(54) METHOD FOR SECURING ACCESS TO A COMPUTER DEVICE

(71) Applicant: Toucan System, Clermont-Ferrand (FR)

(72) Inventors: Jonathan Brossard, Clermont-Ferrand (FR); Nicolas Massaviol, Courbevoie (FR)

(73) Assignee: TOUCAN SYSTEM, Clermont-Ferrand (FR)

( * ) Notice: Subject to any disclaimer, the term of this patent is extended or adjusted under 35 U.S.C. 154(b) by 0 days.

(21) Appl. No.: 14/390,801

(22) PCT Filed: Apr. 2, 2013

(86) PCT No.: PCT/FR2013/050728
§ 371 (c)(1),
(2) Date: Oct. 6, 2014

(87) PCT Pub. No.: WO2013/150238
PCT Pub. Date: Oct. 10, 2013

(65) Prior Publication Data
US 2015/0121497 A1   Apr. 30, 2015

(30) Foreign Application Priority Data
Apr. 5, 2012 (FR) ..................... 12 53173

(51) Int. Cl.
G06F 7/04       (2006.01)
H04L 29/06      (2006.01)
G06F 21/57      (2013.01)
G06F 17/30      (2006.01)

(52) U.S. Cl.
CPC ........ H04L 63/0869 (2013.01); G06F 21/575 (2013.01)

(58) Field of Classification Search
CPC .......... G06F 21/575; G06F 8/665; G06F 8/20; G06F 8/35; G06F 21/572; G06F 21/64; G06F 8/65; H04L 63/0869; H04L 63/0876; H04L 67/34
USPC ..................... 726/7; 717/170, 171
See application file for complete search history.

(56) References Cited

U.S. PATENT DOCUMENTS

| | | | | |
|---|---|---|---|---|
| 5,937,063 A * | 8/1999 | Davis | ............... | G06F 12/1408 711/E12.092 |
| 6,327,660 B1 * | 12/2001 | Patel | .................. | G06F 21/575 380/277 |
| 2003/0115471 A1 * | 6/2003 | Skeba | .............. | H04L 63/0428 713/180 |
| 2006/0056630 A1 * | 3/2006 | Zimmer | ............. | B82Y 10/00 380/256 |
| 2008/0028235 A1 * | 1/2008 | Smith | ................. | G06F 21/575 713/190 |
| 2008/0046548 A1 * | 2/2008 | Doran | ................. | H04L 12/66 709/222 |
| 2008/0082680 A1 * | 4/2008 | Grewal | ............... | G06F 9/4416 709/232 |
| 2008/0256595 A1 | 10/2008 | Schunter et al. | | |
| 2009/0178141 A1 | 7/2009 | Panasyuk | | |
| 2009/0187900 A1 * | 7/2009 | Nakamoto | ............. | G06F 8/65 717/168 |
| 2009/0190758 A1 * | 7/2009 | Pourzandi | ............ | G06F 9/468 380/255 |
| 2009/0327675 A1 * | 12/2009 | Cherian | .............. | G06F 9/4401 713/1 |
| 2010/0008510 A1 * | 1/2010 | Zayas | ................. | G06F 21/78 380/283 |
| 2010/0082960 A1 * | 4/2010 | Grobman | ............ | G06F 21/575 713/2 |
| 2010/0082963 A1 * | 4/2010 | Li | ..................... | G06F 11/1417 713/2 |
| 2010/0082987 A1 * | 4/2010 | Thom | ................. | G06F 21/34 713/171 |
| 2010/0122076 A1 * | 5/2010 | Witty | ................. | G06F 21/575 713/2 |
| 2010/0169631 A1 * | 7/2010 | Yao | ..................... | G06F 9/44 713/2 |
| 2010/0169640 A1 * | 7/2010 | Smith | ................ | G06F 21/335 713/155 |
| 2010/0299510 A1 * | 11/2010 | Ueltschey | ........... | G06F 21/575 713/2 |
| 2011/0113181 A1 * | 5/2011 | Piwonka | ............. | G06F 8/65 711/102 |
| 2011/0197066 A1 * | 8/2011 | Senda | ................. | H04L 9/0822 713/171 |
| 2011/0296409 A1 * | 12/2011 | Lo | ........................ | G06F 8/71 718/1 |
| 2012/0011219 A1 * | 1/2012 | Zhang | ................. | G06F 8/61 709/217 |
| 2012/0042376 A1 * | 2/2012 | Dolgunov | ............. | G06F 9/4406 726/19 |
| 2012/0179904 A1 * | 7/2012 | Dunn | .................. | G06F 21/575 713/155 |

FOREIGN PATENT DOCUMENTS

WO   WO 2008/024135   2/2008

OTHER PUBLICATIONS

PCT/FR2013/050728 International Search Report dated Jul. 26, 2013 (4 pages including English translation).

* cited by examiner

*Primary Examiner* — Gary Gracia
(74) *Attorney, Agent, or Firm* — Brinks Gilson & Lione

(57) ABSTRACT

The invention relates to a method for securing access to a computer device, that includes the step of establishing a secured connection and authentication of said computer device and the user of the computer device with a remote server, wherein the steps of establishing the secured connection and authentication are carried out upon the execution of commands included in a data set adapted for implementing the pre-start of the computer device before triggering the execution of the boot loader of the computer device operating system.

16 Claims, No Drawings

METHOD FOR SECURING ACCESS TO A COMPUTER DEVICE

This application claims priority to International Application No. PCT/FR2013/050728 filed Apr. 2, 2013; and French Patent Appln. 1253173 filed Apr. 5, 2012; the entire contents of each are incorporated herein by reference.

BACKGROUND

This invention relates to methods of securing access to a computer device so that it can be integrated into cloud computing.

Cloud computing refers to a concept aimed at transferring storage and computer processing traditionally located on local servers or a computer device, to remote servers. More precisely, according to the NIST (National Institute of Standards and Technology), cloud computing is access through the network on demand and in free service to virtual and shared computer resources.

This term cloud computing can also be called virtual computing, computing in the cloud, dematerialised computing or infocloud.

The state of the art in the field of secure access to a computer device includes the use of a method of checking a user designed to authenticate the user through an interface generated by the operating system and executed by said device, making use of a user identifier and password pair.

A major disadvantage of this type of process is that in using a method of checking the user within the operating system, access to the computer device is made vulnerable by attacks aimed for example at usurping the identity of this user. A physical change to a computer is also a blocking problem in the context of roaming users.

This invention aims at solving problems resulting from the disadvantages of the state of the art, so as to make computing compatible with cloud computing ambitions while enabling an integrity check of the sealed equipment, the operating system and a much more satisfactory decor-related authentication of the hardware and the user before the main operating system starts.

SUMMARY

The invention is aimed at improving the application of mechanisms to strengthen security related to access to computer devices and then to reduce the probability of attacks from succeeding, for example in the form of a malware, or identity usurpation or physical backdooring. It also aims at allowing separate authentication of the hardware and users compatible with creation of a physically distributed secure network (cloud computing).

One aspect of this invention to achieve this purpose relates to a method of securing access to a computer device comprising a step to set up a secure connection and authentication of said computer device and the user of this computer device with a remote server in which said steps to set up a secure connection and authentication are carried out during execution of instructions included in a data set capable of initiating a preliminary startup of the computer device before execution of the operating system bootloader of said computer device.

According to particular embodiments:
the step to set up a secure connection between said computer device and the remote server is made during execution of said instructions designed to encrypt the exchanged data;

the authentication step comprises a sub-step consisting of an exchange between the computer device and the remote identification elements server designed to mutually authenticate said computer device and the remote server.

the authentication step comprises the following sub-steps:
the computer device sends identification data for a user of said computer device to the remote server;
the bootloader of said operating system is executed when the user identification data are valid.

the instructions contained in the data set are executed to switch the computer device off:
if the identification element sent to the remove server is not valid, or
if the identification data of a user of said computer device are not valid.

the method includes a step to determine identification data of the data set based on which the remote server triggers an update to said data set in order to pre-boot the computer device before execution of the bootloader of said computer device operating system.

the data set capable of pre-booting the computer device before execution of the bootloader of said computer device operating system relates to one of the following codes:

EFI;
BIOS;
UEFI;
firmware of a peripheral.

DETAILED DESCRIPTION

In one embodiment of the invention, the secure access method is implemented by a remote server and a computer device.

In general, this computer device non-limitatively corresponds to all devices including:
processing means: at least one microprocessor and memory means (volatile and/or non-volatile memory and/or mass memory);
input means such as a keyboard and/or a mouse and/or a touch screen, or voice control means;
display means;
computer buses: USB port;
biometric sensor: fingerprint, iris, face recognition, etc.;
communication means;
identification smart cards.

For example, communication means of this device relate to the following technologies and/or standards:
WI-FI (wireless fidelity) and/or Wimax, and GPRS (General Packet Radio Service), GSM, UMTS, HSDPA or IMS (IP MultimediaSubsystem), or
Ethernet, Ethernet Gigabit.

This computer device is said to be physically sealed, in other words it cannot be open without physically damaging it. For example, it could be hermetically filled with a gas such as argon or another non-toxic inert gas, and the start button of this device can be coupled with a chemical detector to verify that the gas composition inside the computer has not changed. Other solutions also exist based on special glues, or chassis conductivity measurements such that unscrewing a screw on the computer makes it unusable.

This computer device also comprises a storage means such as a hard disk containing a partition comprising an operating system and a bootloader of said operating system encrypted using a symmetric AES (Advanced Encryption Standard) type encryption algorithm.

The processing means of this computer device are capable of using a computer code related to an algorithm corresponding to a computer program archived in the memory means of the computer device comprising instructions for performing the processing necessary to perform the steps in the method according to one embodiment of the invention.

For example, this code relates to a data set capable of pre-booting the computer device. Pre-booting refers to start sequences executed before execution of the bootloader.

Non-limitatively, this data set corresponds for example to the BIOS (Basic Input Output System), or EFI (Extensible Firmware Interface), or UEFI (Unified Extensible Firmware Interface) or any firmware of peripherals of said computer device (for example ISA, PCI or PCI Express).

It will be noted that in the context of this embodiment, the term firmware refers to any microsoftware or internal software or onboard software. It applies to a set of instructions and data structures integrated into the computer hardware, including a computer device or a peripheral of this device.

In the case of the BIOS, it is contained in the memory means of the device, for example a ROM of the motherboard of this device.

For example, the BIOS can be used to perform elementary operations when the device is powered up, such as hardware recognition (BIOS POST), and then execution of the bootloader that in turn starts up the operating system of the device.

In this embodiment, when the user switches the computer device on, this device must firstly be authenticated with a remote server before any other operation is performed.

The authentication step implemented in this method of securing access to this computer device is done during the pre-boot, in other words from the BIOS or the EFI or the UEFI or the firmware of a peripheral, and before transferring control to the bootloader of the operating system.

In the state of the art, all identification of this type is done from the operating system, in other words much later.

The method of securing access to a computer device includes a step to set up a secure connection and an authentication of the computer device and the user of this computer device with a remote server.

Firstly, the BIOS or the EFI or the UEFI or the firmware of a peripheral performs a checksum of the physical integrity of all firmware present: BIOS or EFI or UEFI or the firmware of a peripheral (see TrustedComputing: the mechanism is the same).

The step to set up a secure connection between said computer device and the remote server is done during execution of said instructions aimed at encrypting the exchanged data.

For example, the BIOS or the EFI or the UEFI or the firmware of a peripheral comprises a module capable of making a secure connection for example through Kerberos. Kerberos is a network authentication protocol that is based on a secret key mechanism (symmetric encryption) and the use of tickets. Any other protocol and algorithm with a public key/private key can also be used.

The integrity of the module is assured by a couple composed of an HSM (Hardware Security Module) and a random generator in the form of a physical peripheral (or their equivalent in the form of a TPM (Trusted Platform Module) cryptoprocessor and related to a hardware cryptographic component.

In the method, the computer device with the remote server and the user are mutually authenticated using a strong asymmetric algorithm such as pairs of RSA (Rivest Shamir Adleman) or DSA type keys, for example (from TPM/HSM) as certificate.

The authentication step is implemented as soon as the connection between the computer device and the remote server has been set up.

This authentication step comprises a first sub-step corresponding to an exchange of identification elements such as a key by the computer device and by the remote server, aimed at mutually authenticating said computer device and remote server.

If the identification element transmitted to the remote server is not valid, the computer device is switched off by the execution of instructions contained in the data set.

If the remote server does not recognise the validity of the presented key through use of its public key, it breaks the connection. In this case, the BIOS/EFI or its extension do a shutdown. In practice, this is sufficient to make the computer device completely unusable (main operating system never starts up, the user's data are never decrypted).

If the identification element (in this case the key) is valid because the server has used its public key and recognised that the device identifier is valid, the connection is not interrupted.

The method then includes a step to determine identification data of the data set, for example the version of the BIOS firmware on the basis of which the remote server triggers an update of said data set in order to start the pre-boot of the computer device, in other words to update the BIOS or the EFI or the UEFI or the firmware of a peripheral.

In other words, the method can be used to verify if the BIOS or the EFI or the UEFI of the firmware of a peripheral must be flashed or if it is up to date.

The computer device then makes a checksum of the BIOS or the EFI or the UEFI and all firmware of all peripherals and verifies the integrity (TPM supports at least SHAI, the same can be done with an HSM that supports better algorithms such as SHA256).

The version of the BIOS or the EFI or the UEFI firmware or the firmware of a peripheral is hard coded in the firmware.

The computer device sends the version of its firmware to the server. The server compares it with the most recently available version. Nothing will be done if it is up to date.

If not, the remote server sends a mini bootloader capable of flashing the firmware in question and a new version of the firmware through the set up secure connection. The computer device downloads this mini bootloader and executes it, which has the effect of flashing the firmware. It then resigns and reseals the HSM/TPM with its new hash sum and does a cold reboot.

The method then includes a step to make a checksum of the partition of the storage means including an operating system and the bootloader of said operating system so as to obtain a hash value based on which the remote server triggers an update to the operating system.

Starting from this step, the method has the advantage that it is capable of checking the integrity of the partition of the storage means, for example a hard disk, and that it does not require an update.

The computer device then performs a checksum (TPM supports SHAI, the same can be done with HSM+entropy generator) of the hard disk partition containing the operating system, and the bootloader of said operating system encrypted through AES. The operating system temporary data (/tmp or /var under unix/Linux, swap, temporary files etc., are not placed in this partition but are considered to form part of the user's data, and therefore they are placed on the medium provided for this purpose). It sends the hash value to the remote server through the encrypted connection.

The remote server compares this hash value with the up to date version of the operating system that it maintains. If the hash value is different, then the remote server replies to the computer device with a message containing an update command (equivalent to "not good!" Download new operating system") and sends a new copy of the up to date operating system still encrypted through AES, to the computer device. The integrity of the operating system and the bootloader is then guaranteed. If the version of the operating system is up to date, the server simply sends a continue message (equivalent to "operating system up to date, continue").

In one embodiment of the invention, the operating system is not present in the memory means of the computer device and is then downloaded from the remote server every time that the computer device starts. This is particularly suitable if there is an access to the Gigabit network and the operating system is downloaded from the local network (for example SAN—Storage Area Network).

This authentication step includes another sub-step corresponding to the computer device receiving a symmetric cryptographic key (typically AES) from the remote server that can be used to decrypt a partition of a means of storage of said device comprising an operating system and a bootloader of said operating system.

The server sends the AES key to the computer device. The computer device can then technically decrypt the operating system on the fly, but will do nothing until the user has been authenticated.

This authentication step also comprises a sub-step corresponding to the computer device sending identification data for a user of said computer device to the remote server.

For example, the user inputs his biometric coordinates through the dedicated sensor integrated into the computer device (e.g.: fingerprint). The BIOS or the EFI or the UEFI or the firmware of a peripheral sets up a connection through Kerberos, for example within the secure connection, to the remote server.

The BIOS or the EFI or the UEFI or the firmware of a peripheral decrypts the "data" partition contained on the user's USB key (a second partition or a second hard disk installed in the computer could also be envisaged).

This authentication step comprises another sub-step corresponding to decryption of the content of said partition from the cryptographic key (private key associated with the user generated from his or her biometric data) and execution of the bootloader of said operating system.

Thus, the BIOS or the EFI or the UEFI or the firmware of a peripheral verifies the integrity of the operating system and the bootloader and transfers execution to the bootloader, and the bootloader starts the operating system.

Encryption of the operating system and the bootloader of said operating system makes it possible to prevent attacks by opening the customer workstation (or even destroying it) and analysing the content of the operating system to find vulnerabilities in it.

When the computer device sends user identification data to the remote server, instructions contained in the data set are executed to switch said computer device off if the identification data of the user of said computer device are not valid.

If it is found that these data are not valid during the step to compare the user's biometric data with the list of authorised users, the user will not be authorised and the remote server sends a "user not accepted" message to the computer device that then does a shutdown.

It will be noted that there is an obvious "pass the hash" to authenticate the user, but this makes use of a previously set up and validated connection.

The invention claimed is:

1. A method of securing access to a computer device comprising a processor and memory, the method comprising:
   storing, by the processor, an encrypted operating system and an operating system bootloader in a first partition of the memory;
   storing, by the processor, operating system temporary files in a second partition of the memory, wherein the second partition is separate from the first partition; and
   setting up a cryptographically secure connection and authentication of said computer device and a user of the computer device with a remote server, wherein setting up the cryptographically secure connection and authentication is carried out during execution by the processor of instructions included in a data set configured to cause the processor to initiate a preliminary start up of the computer device before execution of the operating system bootloader of said computer device and wherein the encrypted operating system is decrypted at the computer device during the preliminary start up of the computer device using a first cryptographic key sent by the remote server through the cryptographically secure connection, and wherein the authentication comprises the decryption of the operating system temporary files stored in the second partition using a second cryptographic key associated to the user;
   calculating a checksum of the encrypted operating system;
   sending the checksum to the remote server over the cryptographically secure connection for verification; and
   receiving, from the remote server, a replacement encrypted operating system over the cryptographically secure connection when the remote server determines an update to the operating system is available based on the verification of the checksum.

2. The method according to claim 1, wherein setting up the cryptographically secure connection between said computer device and the remote server is made during execution by the processor of said instructions designed to encrypt exchanged data used for securing the cryptographically secure connection.

3. The method according to claim 2, wherein the authentication comprises a sub-step consisting of an exchange between the computer device and the remote server of identification elements designed to mutually authenticate said computer device and the remote server.

4. The method according to claim 3, wherein the authentication comprises the following sub-steps:
   sending, by the computer device, identification data for a user of said computer device to the remote server; and
   executing the bootloader of said operating system when the user identification data are valid.

5. The method according to claim 4, wherein the instructions contained in the data set are executed to switch the computer device off, if the identification element sent to the remove server is not valid, or if the identification data of a user of said computer device are not valid.

6. The method according to claim 4, further comprising determining identification data of the data set based on whether the remote server triggers an update to said data set in order to pre-boot the computer device before execution of the bootloader of said computer device operating system.

7. The method according to claim 3, wherein the instructions contained in the data set are executed to switch the computer device off:
　if the identification element sent to the remove server is not valid, or
　if the identification data of a user of said computer device are not valid.

8. The method according to claim 7, further comprising determining identification data of the data set based on whether the remote server triggers an update to said data set in order to pre-boot the computer device before execution of the bootloader of said computer device operating system.

9. The method according to claim 3, further comprising determining identification data of the data set based on whether the remote server triggers an update to said data set in order to pre-boot the computer device before execution of the bootloader of said computer device operating system.

10. The method according to claim 1, wherein the data set capable of pre-booting the computer device before execution of the bootloader of said computer device operating system relates to one of the following codes:

---

EFI;
BIOS;
UEFI;
firmware of a peripheral.

---

11. The method according to claim 1, wherein setting up the cryptographically secure connection comprises establishing a cryptographically secure connection by a protocol using a public/private key.

12. A method of securing access to a computer device comprising a processor and memory storing an encrypted operating system and an operating system bootloader, the method performed by the computing device during a preliminary startup procedure prior to execution of the operating system bootloader, the method comprising:
　storing the encrypted operating system and the operating system bootloader in a first partition of the memory;
　storing operating system temporary files in a second partition of the memory, wherein the second partition is separate from the first partition;
　setting up a cryptographically secure connection between the computer device and a remote server;
　sending authentication data to the remote server over the cryptographically secure connection;
　receiving a first decryption key from the remote server over the cryptographically secure connection;
　decrypting, at the computer device, the encrypted operating system stored in memory of the computer device using the first decryption key;
　transferring execution from the preliminary startup procedure to the bootloader of the operating system;
　decrypting the operating system temporary files stored in the second partition using a second decryption key associated to the user;
　calculating a checksum of the encrypted operating system;
　sending the checksum to the remote server over the cryptographically secure connection for verification; and
　receiving, from the remote server, a replacement encrypted operating system over the cryptographically secure connection when the remote server determines an update to the operating system is available based on the verification of the checksum.

13. The method according to claim 12, further comprising:
　receiving the encrypted operating system over the cryptographically secure connection.

14. The method according to claim 12, wherein computer code for causing the processor to execute the method is stored in memory selected from the group consisting of Extensible Firmware Interface, Basic Input Output System, Unified Extensible Firmware Interface, and a firmware of a peripheral.

15. A method of securing access to a remote computer device comprising a processor and memory storing an encrypted operating system and an operating system bootloader, the method comprising:
　storing the encrypted operating system and the operating system bootloader in a first partition of the memory;
　storing operating system temporary files in a second partition of the memory, wherein the second partition is separate from the first partition;
　encrypting an operating system for the remote computer device using an encryption key;
　storing the encryption key remote from the computer device;
　setting up a cryptographically secure connection between the remote computer device and the server;
　receiving authentication data from the remote computer device over the cryptographically secure connection;
　verifying the authentication data;
　in response to verifying the authentication data, sending the decryption key for decryption of the operating system to the remote computer device over the cryptographically secure connection;
　decrypting the operating system temporary files stored in the second partition using a second decryption key associated to the user;
　receiving a checksum from the remote computer device over the cryptographically secure connection;
　verifying the checksum; and
　sending a replacement encrypted operating system over the cryptographically secure connection when verifying the checksum determines an update to the operating system is available.

16. The method according to claim 15, further comprising:
　sending an encrypted operating system over the cryptographically secure connection.

* * * * *